June 21, 1955     D. J. TRICEBOCK     2,711,510
METAL DETECTOR BALANCE CONTROLS
Filed June 21, 1950
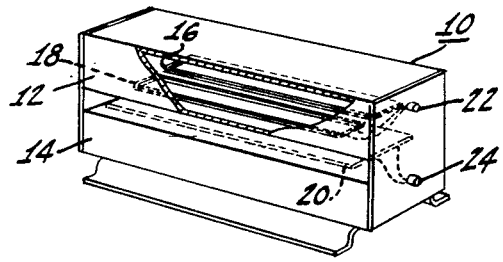
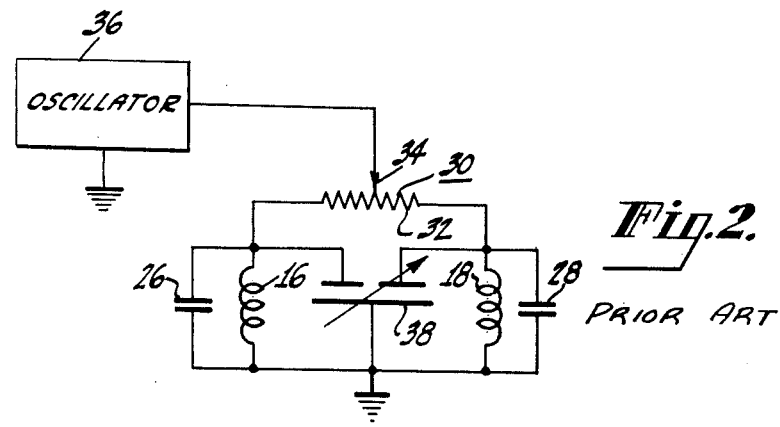
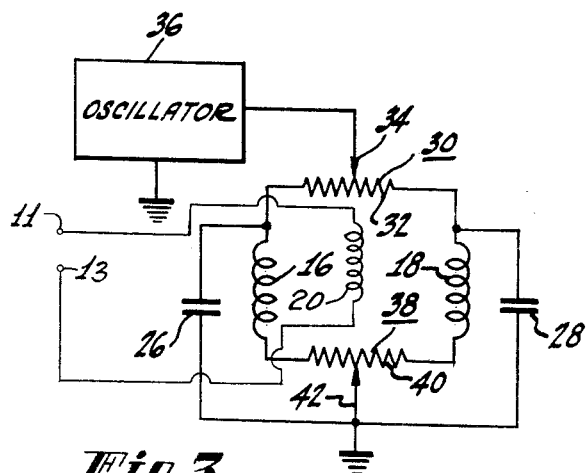
INVENTOR
DONALD J. TRICEBOCK
BY
ATTORNEY

United States Patent Office 2,711,510
Patented June 21, 1955

2,711,510

METAL DETECTOR BALANCE CONTROLS

Donald J. Tricebock, Erlton, N. J., assignor to Radio Corporation of America, a corporation of Delaware Application June 21, 1950, Serial No. 169,306

5 Claims. (Cl. 324—41)

The present invention relates to inspection apparatus and more specifically to an improvement in metal detecting apparatus.

The general principle of operation of metal detectors or inspection machines of the general type contemplated, insofar as the present invention is concerned, involves the establishment of induced alternating voltages which are normally of equal amplitude and opposite phase. This may be accomplished, for example, by applying alternating currents to a primary coil, to establish a magnetic field, and positioning two opposingly wound and connected secondary coils in the field, which are so spaced that the voltages induced therein are normally equal and opposite. Alternatively, two magnetic fields may be established by a pair of primary coils in symmetrical coupling relation to a single secondary or to two secondary windings connected in opposition. The initial operating condition is normally a null balance.

In order to indicate or detect a metal particle, the material being tested is passed through a passageway between the primary and secondary coils by any convenient means, usually a traveling dielectric conveyor belt. It is well known that the magnetic field around a coil extends a considerable distance and that any conductor or magnetic material brought into this field will distort it. Distortion may be due to the magnetic permeability of the metal or due to the magnetic field produced by currents induced in the object if it is conductive. Consequently, the initial balance, which is critical, will be upset by any object having electrical properties of permeability or conductivity which is placed in or near the field of the device.

The sensitivity of a metal detector is directly dependent upon how low an initial balance or null voltage can be obtained. The lower the null the greater the resultant effect produced by a given metallic object or the smaller the size of a metallic object that can be detected. It is difficult and expensive to produce a pair of exactly symmetrical coils for a metal detector. The coils in a detector are usually mounted in a shielding container. Difficulty is also experienced in making such shielding containers symmetrical so that they affect both coils equally. A practical system, to which resort is had to overcome these difficulties, is the provision of electrical means for precise adjustment of the bridge balance. Such adjustment is carried out by observing the amplitude of the null voltage by means of a suitable meter and then adjusting suitable electrical controls to reduce this amplitude to a minimum. These electrical controls introduce electrical unbalance into the circuits of the field coils to compensate for existing mechanical or electrical dissymmetry of the metal detector itself.

The compensating electrical unbalance introduced must be adjustable in both phase and amplitude to compensate for the phase and amplitude of the induced unbalance voltages. A balancing system presently in use with a pair of parallel resonant field coils which provide the electromagnetic field has a potentiometer connected between the coils and the exciting generator and a double stator variable air capacitor connected across both field coils. The potentiometer adjusts the amplitude and the capacitor serves to adjust the phase of the electrical unbalance required for compensation. The capacitor is an air capacitor because of the necessary and desirable linear changes available therewith.

Such a balance system, although effective, is limited to a narrow range of electrical unbalance which can be compensated in view of the limits on the physical size of the variable air capacitor used.

It is an object of the present invention to provide an improved balance control system wherein the control range is extremely wide.

In balanced coil systems of the type described above, it is advantageous to use field coils having as low an inductance as may be used with due regard to the available power, the frequency, the inspection area and the intensity of the field required. Besides the reduced cost, a lower inductance pair of field coils minimizes the susceptibility of the coils to external influences that affect the electrostatic couplings within the coil systems. A lower inductance field coil also minimizes the magnitude of second and higher harmonics in the field coil currents. This is advantageous because these frequencies, in general, cannot be balanced out at the same time as the fundamental. The lowest permissible value of inductance is determined by the required voltage range of the capacitive balance control. The reason for this is that to achieve a desired voltage balance range the amount of capacitance appearing in the balancing capacitor must be a certain minimum proportion of the total tuning capacitance. Since the maximum capacitance of the tuning controls is determined by the largest permissible physical size of the variable capacitor this in turn determines the maximum tuning capacitance that can be used. Since the frequency is fixed by other considerations it can be seen that the minimum inductance is thus actually limited by the size of the variable air capacitor used as a balance control.

It is therefore a further object of the present invention to provide an improved balance control system permitting the use of a lower value of inductance for the field coils than heretofore.

It is still another object of the present invention to provide an improved balance control system permitting a reduction in the cost of metal detector field coils.

It is yet another object of the present invention to provide a balance control system which is simpler and more inexpensive than heretofore.

These and other objects are achieved, in accordance with the present invention, by providing balancing controls for the metal detector field coils which consist of a pair of potentiometers. The winding of one of the potentiometers is connected between the field coils and the winding of the other potentiometer is connected into the resonant field coil circuits. The movable arm of each potentiometer is connected to the field exciting generator.

The novel features of the invention, as well as the invention itself, both as to its organization and method of operation, will best be understood from the following description, when read in connection with the accompanying drawing, in which Figure 1 shows in perspective a typical metal detector head, Figure 2 is a circuit diagram of a known balancing control system which is shown to illustrate the principles involved, and Figure 3 is a circuit diagram of a balancing control system which is an embodiment of the present invention.

Referring now to Figure 1, there may be seen a typical metal detector head 10 having an upper housing shield 12 and a lower housing shield 14. These two housing shields are spaced apart by end supports to provide an aperture, or passageway, through which passes a conveyor belt (not shown), on which articles, which are to be inspected for metal particles, are carried. The upper housing shield, 12, contains two field coils 16, 18 (shown in dotted lines) which are disposed side by side and longitudinally along the bottom of the upper housing shield 12. These are the coils which are excited to set up a metal detecting field so that the axis of the field is perpendicular to the plane of the aperture, in a manner well known in the art. The lower housing shield 14 contains a detector coil 20 (shown in dotted lines) which is disposed longitudinally along the upper portion of the lower housing shield 14. Suitable openings are provided in the upper and lower housing shields to permit the detector field to be established across the passageway. The threaded plugs 22 and 24 shown protruding from the upper and lower housing shield are respectively for the purpose of coupling power to the field coils 16, 18 and for coupling the detected signal from the detector coil 20 to an indicator.

Referring now to Figure 2, there is shown a known balancing control system. Each of a pair of field coils 16, 18 has a condenser 26, 28 connected in parallel therewith in order to tune it to resonance at the operating frequency. A potentiometer 30 has its winding 32 connected between one end of each of the field coils 16, 18 and its movable arm 34 connected to an oscillator 36. This potentiometer 30 serves as an amplitude balance control. A variable double stator air condenser 38 is across each of the coils. This air condenser serves as a phase balance control. The side of the coils 16, 18 and condensers 26, 28 not connected to the potentiometer winding 32 are all joined and connected to the oscillator 36.

By adjusting the potentiometer movable arm 34, more or less resistance is inserted in series with each coil. Thus the current supplied to each coil may be controlled and thereby the intensity of the field set up by each coil is determined. By adjusting the variable air condenser the phase of the current through each of the coils and thereby the phase of the field set up by each coil is determined.

Referring to Figure 3, there is shown a circuit diagram of an embodiment of the present invention. Each of a pair of field coils 16, 18 has a condenser 26, 28 associated therewith which has a value selected to permit parallel resonance. A first potentiometer 30 has its winding 32 connected between one of the ends of each field coil 16, 18. A second potentiometer 38 has its winding connected between the other of the ends of each field coil. Each condenser 26, 28 is connected between the junction of the first potentiometer winding 32 with its associated field coil 16, 18 and the movable arm 42 of the second potentiometer. The exciting generator 36 is connected to the movable arms of both first and second potentiometers. Therefore the first potentiometer 30 may be said to have its winding 32 connected between one end of each field coil 16 and 18 and the second potentiometer 38 may be said to have its winding 40 connected into both of the resonant circuits.

The detector coil 20 is shown as linking with the electromagnetic field produced by the field coils 16 and 18. Two terminals 11 and 13 are available for connection to external equipment. These terminals 11 and 13 are connected to the ends of the detector coil 20.

The first potentiometer 30 is in series with the parallel resonant circuits and carries only resistive currents. Adjustment thereof permits adjustment of the amplitude of each of the fields set up by the field coils to overcome any amplitude unbalance existing in the two fields. The second potentiometer is within the resonant circuits themselves and carries predominantly reactive currents. The magnitude of the reactive voltage that affects either one of the field coil circuits can be adjusted by moving the slider of the second potentiometer. This action increases the magnitude of the reactive voltage affecting one coil while simultaneously decreasing the magnitude of the voltage affecting the other coil. In view of the opposing nature of the field coil windings this adjustment permits balancing of any factors causing a reactive or phase unbalance.

Using a first potentiometer, having a value of 15 ohms, and a second potentiometer having a value of one ohm, a variation on the residual balance of a metal detector system was achieved which is five times greater than that of the largest useable air capacitor with the system. The value of the second potentiometer is so small as to leave the "Q" of the field coils relatively unaffected. The above potentiometer values are given merely by way of example and are not to be construed as limitations. By eliminating the minimum residual capacitance due to the balancing capacitor, the inductance of the field coils may be reduced with the concomitant beneficial electrical effects, as previously pointed out. Since the coils require fewer turns their cost of manufacture is also lower.

The two controls are independent of each other. Balancing may be achieved by exciting the field coils and observing the null voltage induced in the detecting coil by means of an indicator connected thereto. One potentiometer is adjusted until a minimum is reached, and then the other potentiometer is adjusted until a further minimum is observed. The metal detector is then ready for operation.

From the foregoing description, it will be readily apparent that an improved balancing system for a metal detector is provided. This improved system permits a wider range of balancing than with previously used systems and permits the reduction of the value of inductance required for the field coils as well as a reduction in the cost thereof. Although the balance controls are shown being used in the circuit of the field coils to establish a balanced electromagnetic field, this is not to be construed as a limitation since the balance controls are also effective in the circuit of the field coils when they are used as detector coils with a single coil setting up a field. Therefore, it is desired that the foregoing shall be taken as illustrative and not as limiting.

What is claimed is:

1. Apparatus for providing a balanced electromagnetic field for a metal detector of the type wherein said balanced electromagnetic field is established across a passageway through which articles to be inspected pass and a detector is positioned at said passageway to detect an unbalance in said field, said apparatus comprising a pair of field coils disposed along said passageway, a pair of condensers each coupled across a separate one of said field coils to establish a pair of parallel resonant circuits, a first potentiometer having its winding connected directly between one end of each of said coils, a second potentiometer having its winding connected into both of said resonant circuits, terminals connected to the movable arms of said first and second potentiometers upon which an exciting voltage may be impressed, and an oscillator for supplying said exciting voltage connected to said terminals.

2. Apparatus for providing a balanced electromagnetic field for a metal detector of the type wherein said balanced electromagnetic field is established across a passageway through which articles to be inspected pass and a detector is positioned at said passageway to detect an unbalance in said field, said apparatus comprising a pair of field coils disposed along said passageway, a pair of condensers each associated with a separate one of said field coils and having its value selected to establish parallel resonance therewith, a first potentiometer having its winding connected directly between one end of each of said pair of field coils, a second potentiometer having its winding connected directly between the other end of each of said pair of field coils, each of said condensers being coupled between said one end of its associated field coil and said second potentiometer movable arm, terminals connected to the movable arms of said first and second potentiometers upon which an exciting voltage may be impressed, and an oscillator connected in series with said terminals for providing said exciting voltage.

3. In metal detecting apparatus of the type having (1) a pair of field coils on one side of a passageway for establishing an electromagnetic field in said passageway, (2) a condenser associated with each of said field coils to establish a parallel resonant circuit therewith, and (3) detecting coil means on the other side of said passageway to detect an unbalance in said electromagnetic field, the combination therewith of means to adjust the current in said field coils to balance said electromagnetic field comprising a first potentiometer having its winding connected directly between one end of each of said field coils, a second potentiometer having its winding connected into both said resonant circuits, terminals connected to the movable arms of said first and second potentiometers upon which an exciting voltage may be impressed, and an oscillator connected in series with said terminals to provide said exciting voltages.

4. In metal detecting apparatus of the type having a pair of field coils disposed along a passageway for establishing an electromagnetic field across said passageway, a condenser associated with each of said field coils to establish a resonant circuit therewith and a detector is positioned at said passageway to detect an unbalance in said field in said passageway, the combination therewith of means to balance said field comprising a first potentiometer having its winding connected directly between one end of each field coil, a second potentiometer having its winding connected directly between the other end of each field coil, terminals connected to the movable arms of each of said potentiometers upon which an exciting voltage may be impressed, and an oscillator connected in series with said terminals to provide said exciting voltage.

5. In metal detecting apparatus of the type having (1) a pair of field coils on one side of a passageway for establishing an electromagnetic field in said passageway, (2) a condenser associated with each of said field coils to establish resonance therewith, and (3) detecting coil means on the other side of said passageway to detect an unbalance in said electromagnetic field, the combination therewith of means to adjust the current in said field coils to balance said electromagnetic field comprising a first potentiometer having its winding connected directly between one end of each of said pair of field coils, a second potentiometer having its winding connected directly between the other end of each of said pair of field coils, each of said condensers being connected directly between said one end of its associated field coil and said second potentiometer movable arm, and an oscillator for exciting said field coils connected in series with said first and second potentiometer arms.

References Cited in the file of this patent
UNITED STATES PATENTS

| | | |
|---|---|---|
| 2,434,203 | Farrow | Jan. 6, 1948 |
| 2,434,547 | Browne | Jan. 13, 1948 |
| 2,457,165 | McNamee | Dec. 28, 1948 |